(12) United States Patent
Tsoutsaios

(10) Patent No.: US 11,750,409 B2
(45) Date of Patent: Sep. 5, 2023

(54) COMPUTER-IMPLEMENTED METHOD OF PERFORMING A WEBRTC-BASED COMMUNICATION AND COLLABORATION SESSION AND WEBRTC-BASED COMMUNICATION AND COLLABORATION PLATFORM

(71) Applicant: Unify Patente GmbH & Co. KG, Munich (DE)

(72) Inventor: Antonios Tsoutsaios, Agia Paraskevi (GR)

(73) Assignee: Unify Patente GmbH & Co. KG, Munich (DE)

( * ) Notice: Subject to any disclaimer, the term of this patent is extended or adjusted under 35 U.S.C. 154(b) by 0 days.

(21) Appl. No.: 17/569,544

(22) Filed: Jan. 6, 2022

(65) Prior Publication Data

US 2022/0217008 A1   Jul. 7, 2022

(30) Foreign Application Priority Data

Jan. 7, 2021 (EP) ..................................... 21150563

(51) Int. Cl.
*H04L 12/18* (2006.01)
(52) U.S. Cl.
CPC ...... *H04L 12/1827* (2013.01); *H04L 12/1818* (2013.01); *H04L 12/1822* (2013.01); *H04L 12/1831* (2013.01)
(58) Field of Classification Search
CPC ............. H04L 12/1827; H04L 12/1818; H04L 12/1822; H04L 12/1831
See application file for complete search history.

(56) References Cited

U.S. PATENT DOCUMENTS 9,467,650 B2 * 10/2016 Jing .................... H04L 65/4038
11,095,693 B1 * 8/2021 Wehrung ............ H04L 65/1089
(Continued)

OTHER PUBLICATIONS

European Search Report for European Patent Application No. 21150563.1 dated May 12, 2021.

*Primary Examiner* — John A Follansbee
*Assistant Examiner* — Raqiul A Choudhury
(74) *Attorney, Agent, or Firm* — Buchanan Ingersoll & Rooney PC

(57) ABSTRACT

A computer-implemented method of performing a Web Real-Time Communication-based (WebRTC-based) communication and collaboration session with a plurality of predefined participants can include detecting that a participant from a plurality of predefined participants is addressed by another participant for answering a question or for submitting a comment during the communication and collaboration session; and verifying whether a presence status of the participant to answer the question or to submit a comment is required to be presented to the predefined participants. If it is verified that the presence status of the participant to answer the question or to submit a comment needs to be presented, a feature activation step of activating a feature for presenting presence information to the predefined participants can be utilized. A communication and collaboration platform can be configured for carrying out an embodiment of computer-implemented method of performing a WebRTC-based communication and collaboration session.

20 Claims, 8 Drawing Sheets

(56) References Cited

U.S. PATENT DOCUMENTS

| | | | |
|---|---|---|---|
| 2014/0122600 A1* | 5/2014 | Kim | H04L 12/1827 709/204 |
| 2014/0325335 A1* | 10/2014 | Paulik | G06F 16/685 715/234 |
| 2017/0236097 A1* | 8/2017 | Smith | G06Q 10/1095 705/7.19 |
| 2018/0077099 A1* | 3/2018 | Silva | H04L 51/04 |
| 2018/0146160 A1 | 5/2018 | Kang et al. | |
| 2022/0070238 A1* | 3/2022 | Yerli | H04L 65/4015 |

* cited by examiner

| Info ID | Tone | Speaker | Phrase | | | | | | |
|---|---|---|---|---|---|---|---|---|---|
| Phrase | Normal | Sara | Today | we | will | discuss | the | next | release. |

| Info ID |
|---|
| Pause |

| Info ID | Tone | Speaker | Phrase | | | |
|---|---|---|---|---|---|---|
| Phrase | Question | Sara | Bob | will | you | start? |

| Info ID |
|---|
| Pause |

| Info ID |
|---|
| Pause |

| Info ID |
|---|
| Pause |

Fig. 3

COMPUTER-IMPLEMENTED METHOD OF PERFORMING A WEBRTC-BASED COMMUNICATION AND COLLABORATION SESSION AND WEBRTC-BASED COMMUNICATION AND COLLABORATION PLATFORM

CROSS-REFERENCE TO RELATED APPLICATIONS

The present application claims priority to European Patent Application No. EP 21 150 563.1, which was filed on Jan. 7, 2021. The entirety of this European Patent Application is incorporated by reference herein.

FIELD

The present invention relates to a computer-implemented method of performing a Web Real-Time Communication-based (WebRTC-based) communication and collaboration session and to a WebRTC-based communication and collaboration platform.

BACKGROUND

Currently, in prior art, there are various solutions known for holding conferences and web collaboration sessions via different devices and interfaces. However, especially when using endpoints with smaller displays, such as mobile phones or desktop phones, or when sharing a screen for identifying participants of a conference call, there exists a major common problem. Namely, especially in cases of repeated meetings, some participants do not enter those conferences or leave the conference earlier and, thus, during the session it is not always easy to identify whether those participants currently are in the session or are not in the session. This might not pose a problem for a small group of conference participants that are communicating via Personal Computers, PCs, but it is problematic in the following cases:
  there are too many participants in a call to be able to track who is in the session;
  mobile devices or desktop phones are used having a small display, or a user may not be able to constantly access the screen options, for example, when participating in a conference via a mobile device while driving or walking; and
  when a user is sharing his/her screen and so is not viewing the collaboration tool on the Graphical User Interface, GUI, that contains all the relevant info

SUMMARY

I determined that the situation might occur that someone poses a question to another participant that is expected to be in the call, but gets no reply since he/she is not in the session. In such a case it would be necessary to either search for the participant in the active call members of the session, the latter, however, not being convenient especially in the cases mentioned above, or to repeat the question until it is assumed that the participant is not in the conference since no reply is received which neither is convenient during an ongoing discussion.

Embodiments of the present invention can be based on an objective to provide a computer-implemented method of performing a WebRTC-based communication and collaboration session and a corresponding WebRTC-based communication and collaboration platform which can enable presenting status information of a participant that is addressed during the communication and collaboration session without unnecessarily disturbing the conversation.

A computer-implemented method of performing a WebRTC-based communication and collaboration session with a plurality of predefined participants is provided, wherein each participant from the plurality of predefined participants has a status of either being present of being absent or present but muted. Embodiments of the method can include a detection step of detecting that a participant from the plurality of predefined participants is addressed by another participant from the plurality of predefined participants for answering a question or for submitting a comment during the communication and collaboration session; and a presence status verification step of verifying whether a presence status of the participant to answer the question or to submit a comment is required to be presented to the plurality of predefined participants. If it is verified that the presence status of the participant to answer the question or to submit a comment needs to be presented, a feature activation step of activating a feature for presenting presence information to the plurality of predefined participants can be utilized.

According to a preferred embodiment of the invention, the feature activation step can be triggered when a reference to a participant from the plurality of predefined participants is detected.

According to another preferred embodiment of the invention, after the feature activation step is triggered, the method can also include a step of monitoring the behavior of the participants from the plurality of predefined participants.

According to another preferred embodiment of the invention, the monitoring step can include adding points to a feature activation trigger counter, wherein the points are assigned to specific types of behavior.

Preferably, if the feature activation trigger counter exceeds a predetermined threshold value within a predetermined time period, then a decision can be made to activate the feature for presenting presence information to the plurality of predefined participants.

Further, it can be advantageous, if the monitoring step includes at least one of verifying the tone in a phrase during the communication and collaboration session that includes the participant to answer the question or to submit a comment, verifying whether the status of the participant to answer the question or to submit a comment is present or absent or present but muted, verifying whether the participant that addresses the participant to answer the question or to submit a comment is currently sharing his or her desktop, verifying if the name of the participant to answer the question or to submit a comment is repeated with a normal tone or with a question tone, verifying if another participant from the predefined plurality of participants checks the list of participants.

According to another preferred embodiment of the invention, each of the verification steps of the monitoring step can be considered as a specific behavior that is assigned to a predetermined number of points. According to still another preferred embodiment of the invention, the points assigned to the specific behaviors are configurable. According to still another preferred embodiment of the invention, the points can be modified based on machine learning. Preferably, the machine learning can include adjusting the rating of each input for increasing or decreasing the points, adjusting the counter value for the feature activation, adjusting the time period for triggering the feature activation, and identifying new behaviors for verifying that the presence status of the participant to answer the question or to submit a comment needs to be presented.

Moreover, embodiments of the method can include other steps. For instance, the method may further comprise as step of storing a key phrase for triggering the feature activation step. As another example, the method can include a step of displaying the presence status of the participant to answer a question or to submit a comment for a predetermined time period to at least one participant from the plurality of predefined participants, in particular, to a moderator of the communication and collaboration session.

According to still another preferred embodiment of the invention, the method can include a step of outputting an audio signal that indicates the presence status of the participant to answer a question or to submit a comment for a predetermined time period to at least one participant from the plurality of predefined participants.

Preferably, the communication and collaboration session is a scheduled conference. In some embodiments, the session can include can include a video conference or an audio conference.

Further, according to the present invention, a WebRTC-based communication and collaboration platform is provided. Embodiments of the platform can include a media server that is adapted to carry out an embodiment of the computer-implemented method. The media server can include hardware components (e.g. a processor connected to a non-transitory computer readable medium and at least one transceiver unit, etc.). In some embodiments, the media server can include a conference media controller, a display controller, a user presence and call signaling controller, a video to text component, and a feature activation component.

By the computer-implemented method of performing a WebRTC-based communication and collaboration session and the corresponding platform, a solution for the above mentioned problem referring to scheduled conferences where the participants in a conference session are predefined can be provided, wherein a verification can be made about whether a status of a participant needs to be presented to at least one other participant or not so that the participants are distracted from the ongoing conversation as little as possible and only if required. The main idea is to utilize the fact that the participants and their status is known, for example, to an application running on a conference or media server which is used for holding the conference or communication session. It also utilizes artificial intelligence speech recognition capabilities in order to detect which are the participants whose participation in the call are in doubt and their presence is required at any given time during the session.

Other details, objects, and advantages of the telecommunications apparatus, system, device, non-transitory computer readable medium, and method will become apparent as the following description of certain exemplary embodiments thereof proceeds.

BRIEF DESCRIPTION OF THE DRAWINGS

The invention and embodiments thereof will be described below in further detail in connection with the drawings. It should be appreciated that like reference numbers can identify similar components.

FIG. 3 illustrates the format of raw data according to an embodiment of the invention;

Figure 1:
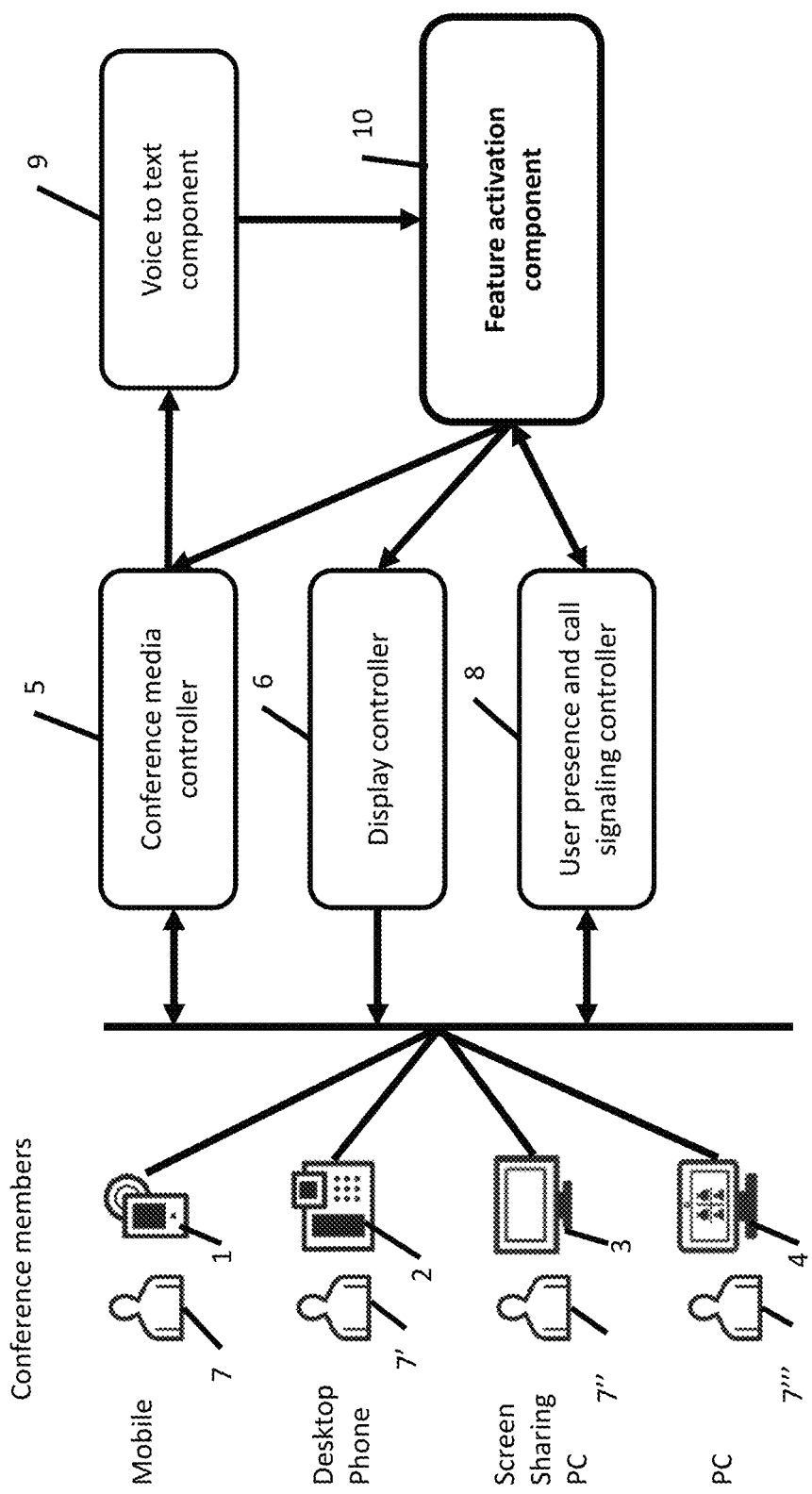
FIG. 1 is a schematic overview of the architecture for implementing a computer-implemented method of performing a WebRTC-based communication and collaboration session according to an embodiment of the invention.

Reference numerals used in the drawings include the following:
  1-4 endpoints;
  5 conference media controller;
  6 display controller;
  7, 7', 7", 7'" conference participants;
  8 user presence and call signaling controller;
  9 voice to text component; and
  10 feature activation component.

DETAILED DESCRIPTION

FIG. 1 is a schematic overview of the architecture together with all relevant interfaces for implementing the computer-implemented method of performing a WebRTC-based communication and collaboration session according to an embodiment of the invention. As illustrated in FIG. 1, all endpoints 1, 2, 3, 4 involved in a scheduled conference have interfaces with the conference media controller 5 for receiving and transmitting payload, with a display or graphical user interface (GUI) controller 6 which controls the information presented to each conference participant 7, 7', 7", 7'" and a user presence and call signaling controller 8 that controls the call signaling for establishing a conference session, all user related actions during this conference in terms of signaling and the presence information of each participant 7, 7', 7", 7'". The endpoints 1, 2, 3, 4 may be represented by various terminals the respective participants 7, 7', 7", 7'" are using, as in the example here, a mobile phone 1, a desk phone 2, a Personal Computer, PC, 3 that shares a screen with the other terminals, and another PC 4. The endpoints are communication devices that include hardware that include a processor connected to non-transitory memory and at least one transceiver unit. The devices can also include a touch screen display, buttons, and/or other input devices or output devices.

In addition to the components mentioned above, there is a voice to text component 9 that receives media streams and translates them into text and the feature activation component or controller 10 which controls the activation or deactivation of the described feature based on received and analyzed data. The interfaces and components described here are required for describing the implementation of the computer-implemented method of performing a WebRTC-based communication and collaboration session according to an embodiment of the invention. However, the components described do not reflect all the required capabilities for a conference session.

The function of each component in the described feature is as follows:

Conference media controller 5: Receives payload data from all conference participants 7, 7', 7", 7''' and feeds this data to the Voice to Text component 9. Payload data may be collected at the direct interface with an endpoint 1, 2, 3, 4 or at the point that the multiplexed payload is forwarded to each conference participant 7, 7', 7", 7'''. The first option makes the implementation more complex and demanding in terms of resources since more streams need to be analyzed but provides the ability to provide more specific information to the relevant conference participants 7, 7', 7", 7''' and achieves a better translation from speech to text since there are no overlapping streams. The second option is less complex and requires less resources since only one stream is analyzed but cannot' provide personalized experience for the conference participants 7, 7', 7", 7'''. The conference Media Controller 5 is also responsible for the transfer of voice notifications to the participants 7, 7', 7", 7''' of the conference.

Voice to Text 9: This component receives the payload streams and transforms them into text. This text may be associated with specific participants 7, 7', 7", 7''' depending on the Media Controller 5 implementation as described above. The text data along with the source of it, if available, is transferred to the feature activation component 10 along with the pauses in speech after each word captured. Depending on the voice to text capabilities, additional info could be transferred along with data such as the tone in voice of the one that was speaking. This info may also be reflected in the data forwarded to the feature activation component 10.

Feature activation component 10: The feature activation component 10 is the one to decide whether the feature shall be triggered or not. This component has access to the names of the conference participants 7, 7', 7", 7'''. As stated above, the conference is scheduled, and the participants 7, 7', 7", 7''' are known beforehand. Thus, the text received is compared to the conference participants' names. If the first name or the last name of any participant 7, 7', 7", 7''' is matching the text received, then this component starts a more detailed analysis of the data that follows to detect whether the feature should be activated or not. A more detailed description on how this algorithm may be implemented will be given below in a separate description of this component. If the result of this analysis is that the feature should be activated, then the relevant signaling is triggered towards the display controller 6 and/or the media controller 5 to inform the relevant participants 7, 7', 7", 7' about the presence and status of the questioned participant 7, 7', 7", 7'. Again, if the info of the participant's voice stream that triggered the feature is available, then there is the option to provide specific notifications only to this participant 7, 7', 7", 7' or different notifications compared to the other participants.

Display controller 6: This component is responsible to transmit the required messages in order to activate the GUI/Display capabilities of each device when the feature is activated.

User presence and call signaling controller 8: This component holds all the info related to the status of the conference and the conference participants 7, 7', 7", 7''' and may provide the relevant data to the feature controller in order to indicate whether the feature should be activated and what information should be transferred to the conference participants 7, 7', 7", 7'''.

Figure 2:
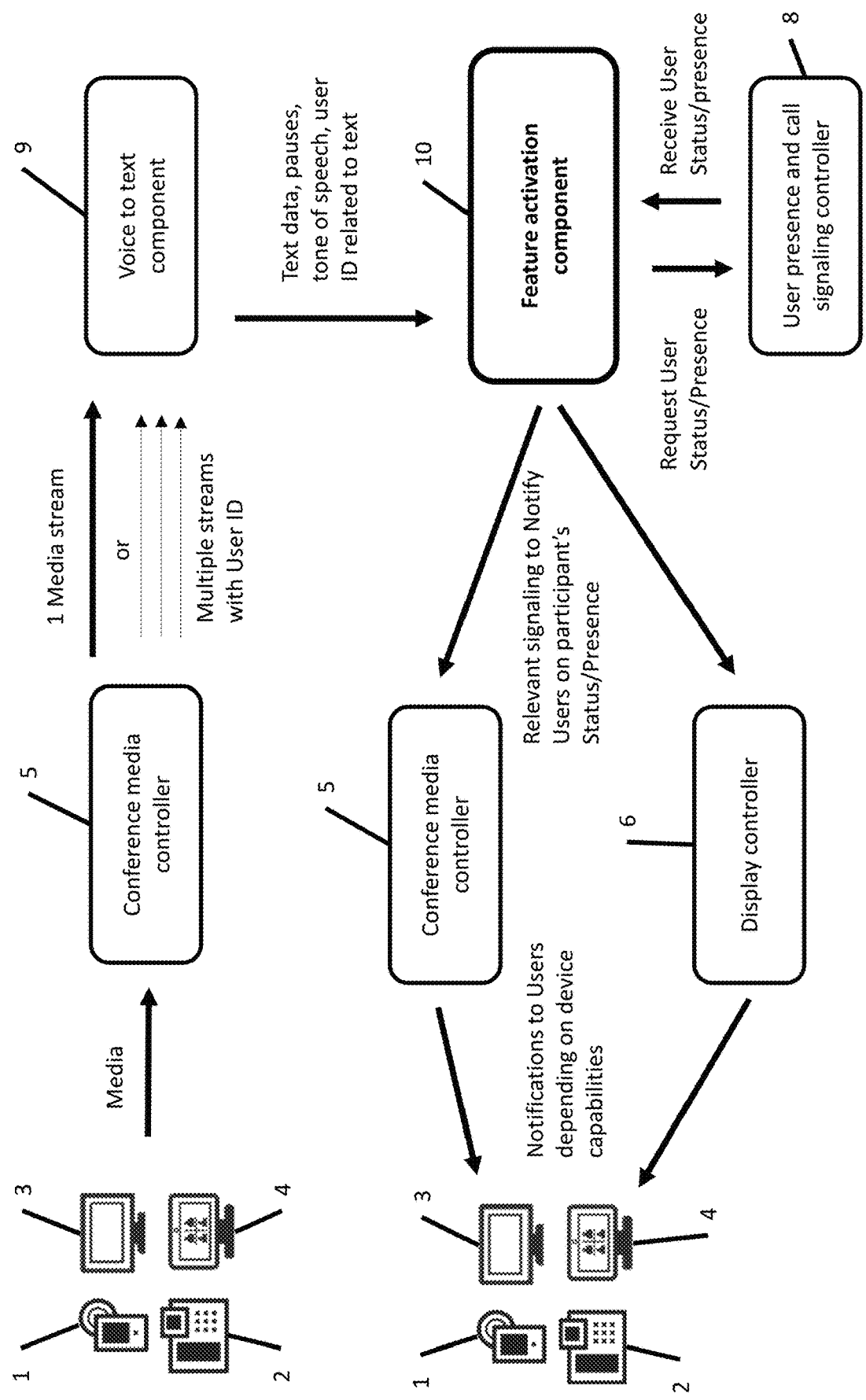
FIG. 2 schematically illustrates the flow of information between the relevant components for carrying out the computer-implemented method of performing a WebRTC-based communication and collaboration session according to an embodiment of the invention.

FIG. 2 schematically illustrates the flow of information between the relevant components for carrying out a computer-implemented method of performing a WebRTC-based communication and collaboration session according to an embodiment of the invention. In the following, it is described how the feature is activated based on the received data and the status of the participants 7, 7', 7", 7'. Input for the feature activation component 10 may be:

Text data

Markup on tone of voice for relevant text if available

Pauses longer than a predefined duration (e.g. 1 second). Each pause input refers to one interval.

User ID for relevant text if available

The raw data received could have the format as illustrated in FIG. 3, for example.

The feature activation component 10 compares each word with the information stored for the conference participants 7, 7', 7", 7'''. The table below shows an an example of the conference participants 7, 7', 7", 7''':

| First name | Last name |
| --- | --- |
| Sara | Parker |
| Maria | Jackson |
| Bill | Johnson |
| Tomas | Papadopoulos |
| Bob | Edison |
| William | Wallace |
| Jessica | Robinson |
| Bob | Kent |

Thus, as the feature activation component 10 reads all the data received, it compares all words received with the first name and last name of the conference participants 7, 7', 7", 7'''. Considering the above example of data received and the stored conference participants 7, 7', 7", 7''', when the analysis of received words gets to the word "Bob", two positive matches are identified. The algorithm that follows to decide whether to present the status of the referenced participant or not could be as simple as when a match is identified instantly presenting the status of the relevant conference participants or not. Otherwise, according to another embodiment, the algorithm may also be more complex and may also include additional verifications, such as:

whether the tone of the speaker implies a question;

whether the phrase that contains the identified name is followed by a pause longer than a specific predefined duration;

whether the same name is referenced again after this pause and followed by a pause and/or a phrase with tone implying a question;

the status of the relevant conference participant referenced. For example, if both Bobs are participating in the call, then it is not reasonable to present their status since they have the chance to reply when they are ready; and the visualization capabilities of the devices used for this call and if the status of Bob is easily visible to Sara who poses the question and the other participants.

A more sophisticated implementation may also consider a Machine Learning, ML, algorithm that is trained by the conference participants habits to decide whether to present the status of the referenced participants 7, 7', 7", 7'" or not. For instance, this algorithm could consider the following:

How fast conference participants do reply when they are addressed in a conference?

What is Sara's usual pause before repeating a question?

What are her usual phrases when repeating a question waiting for an answer?

What is the tone used when a question is placed to a conference participant and what is the tone when the question is repeated, or the participant is questioned again due to no answer?

What is the tone of someone who verbally states the status of the referenced participant?

Do conference participants check the list of participants for the status of the referenced members when the above events occur? This implies that the status is required to be presented.

Those data could be analyzed to compose the most convenient system behavior in terms of the feature activation. Those could define what voice tones and pause duration combinations imply that the status of a conference member is required, at what timeframe since the original question was posed and what should be the default values for timers and so on, used by the feature activation components. Those data could be personalized on each participant and provide an even more personalized experience of the feature, could be restricted to specific data for each conference schedule, or could be global values used for all conferences placed on the specific conference application or device.

The advantage of having a more sophisticated solution for activating the feature as described above is to eliminate notifications that could be distracting for the conference participants 7, 7', 7", 7'".

Figure 4:
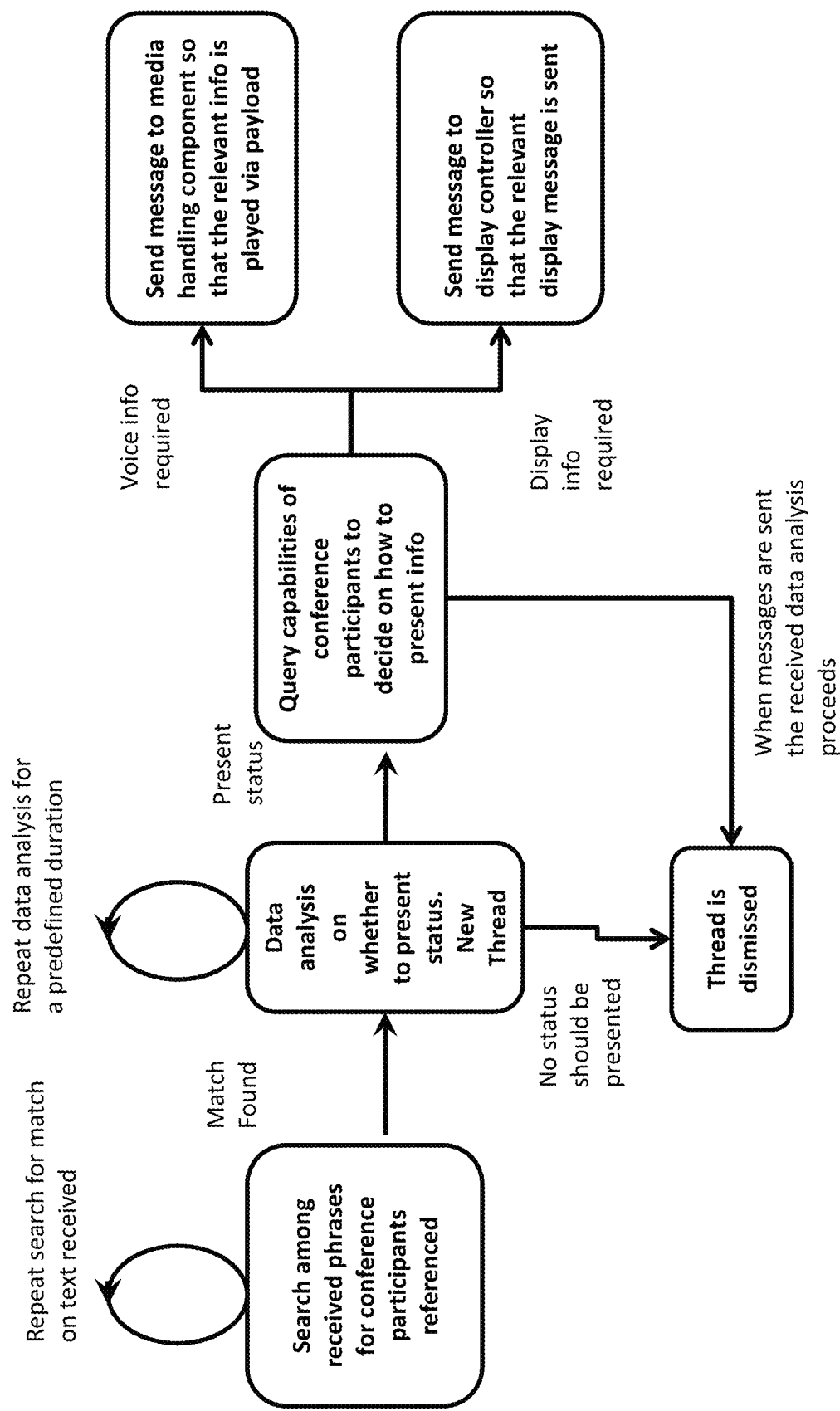
FIG. 4 schematically illustrates the logical steps to activate the feature according to an embodiment of the invention.

FIG. 4 schematically illustrates logical steps to activate the feature according to an embodiment of the invention. The data analysis necessary that is carried out in the feature activation component 10 for deciding whether to activate the feature or not is based on the overall data received from the feature activation controller. Once the reference of a conference participant 7, 7', 7", 7'" is identified, this mechanism is activated and the feature activation controller will monitor specific behaviors. Those behaviors are monitored on a separate thread for names mentioned that matches conference participants 7, 7', 7", 7'". The mechanism is based on a point system. Each behavior is assigned to a specific amount of points and those are added cumulatively composing the feature activation triggering counter. If this counter exceeds a specific limit within a predefined time period, then the feature activation controller decides that the feature should be activated. If not, then the feature activation component decides that the feature activation is not required and then the whole process is reset to the initial status at which text input data from the conversation is received, and the relevant thread is dismissed. Finally, if during the data analysis, another text matches the conversation participant that is different to the one under analysis, then another data analysis process is initiated at a different thread/instance of the feature activation controller, that repeats the same algorithms for the new conference participant. Conference text data is routed to all active monitoring threads.

The table below summarizes a proposed initial point system based on the input received from the feature activation controller. This list may also contain more points to check and additional info that could be collected from the media of the conference, the status of the participants, the capability of the devices, and/or the behavior of the participants. In the column "initial check" at the right hand side of the table, the checks performed when initially a name is identified are marked. The rest are monitored for a predefined period of time and input on those affects the feature activation decision.

| Input | Points | Initial check |
| --- | --- | --- |
| Tone in phrase that includes the conference participant is question | 5 | x |
| Participant requested is not in the call | 3 | x |
| Participant requested is in the call, but muted | 2 | x |
| Member that places the question is sharing desktop, using mobile phone or desktop phone. | 3 | x |
| For each 1 second of pause | 1 | — |
| One participant checks the list of participants in the conference | 1 | — |
| Second participant checks the list of participants | 5 | — |
| Name is repeated with tone normal | 2 | — |
| Name is repeated with tone question | 5 | — |

The referenced points are indicative and may vary, may be configurable or may be changed on the basis of machine learning algorithms based on conference participants' behavior. In order to provide an example on how this works, in this embodiment, it is assumed that 10 points are a triggering limit for activating the feature and the monitoring time period for monitoring the respective behaviors may be 10 seconds.

Figure 5:
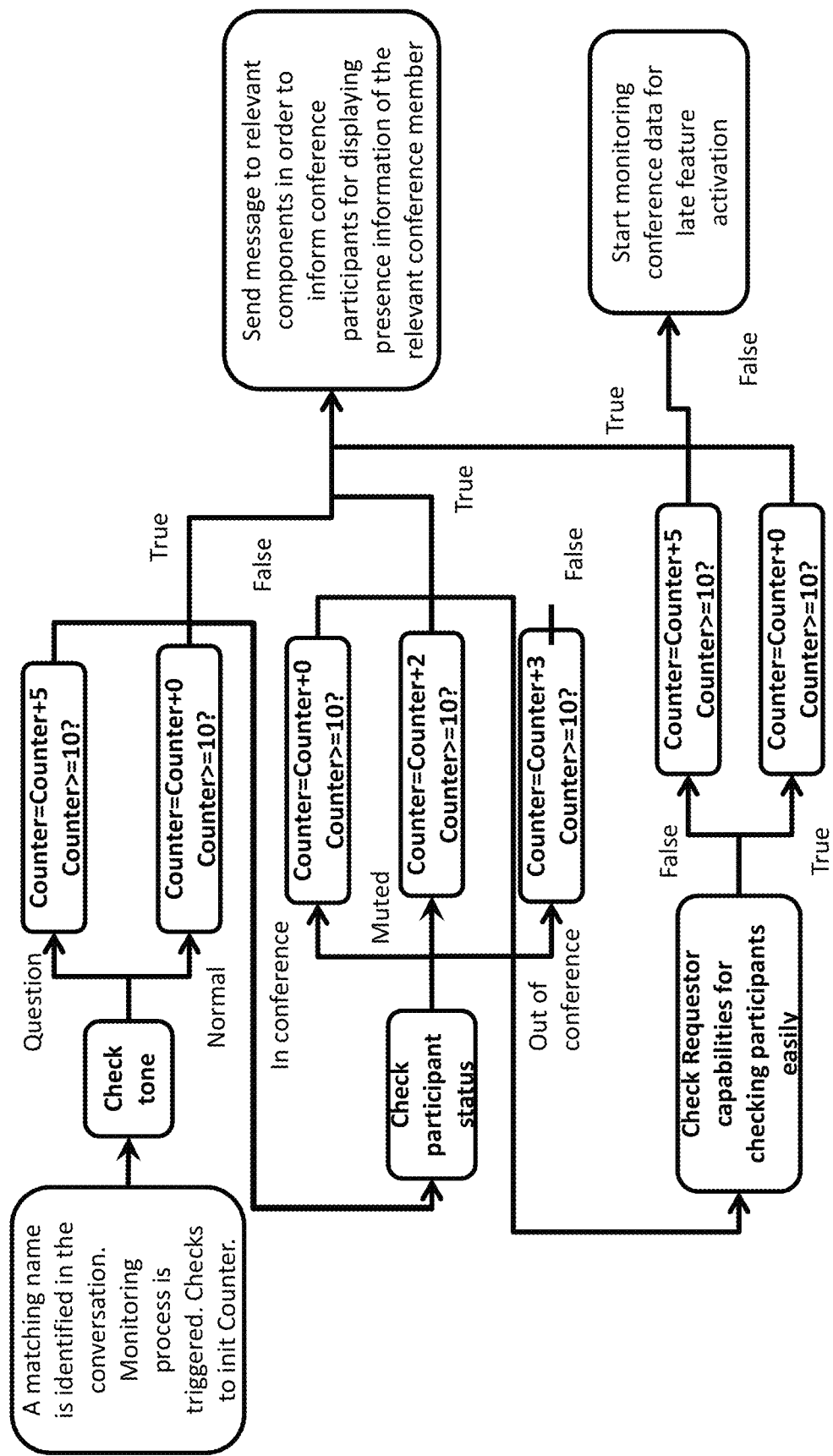
FIG. 5 schematically illustrates a decision process for starting the activation of the feature according to an embodiment of the invention.

FIG. 5 schematically illustrates an exemplary decision process for starting the activation of the feature according to an embodiment of the invention. The process starts by verifying the initial data and the current status of the involved participants. Each of the initial checks serves for increasing the counter and for each point, it is verified whether the feature activation limit or threshold has been reached. If not, the feature activation controller keeps monitoring input from the conference in order to decide whether the feature should be activated or not. If yes, the feature is activated, and the relevant info capabilities of the end devices are utilized to display the relevant presence info.

Figure 6:
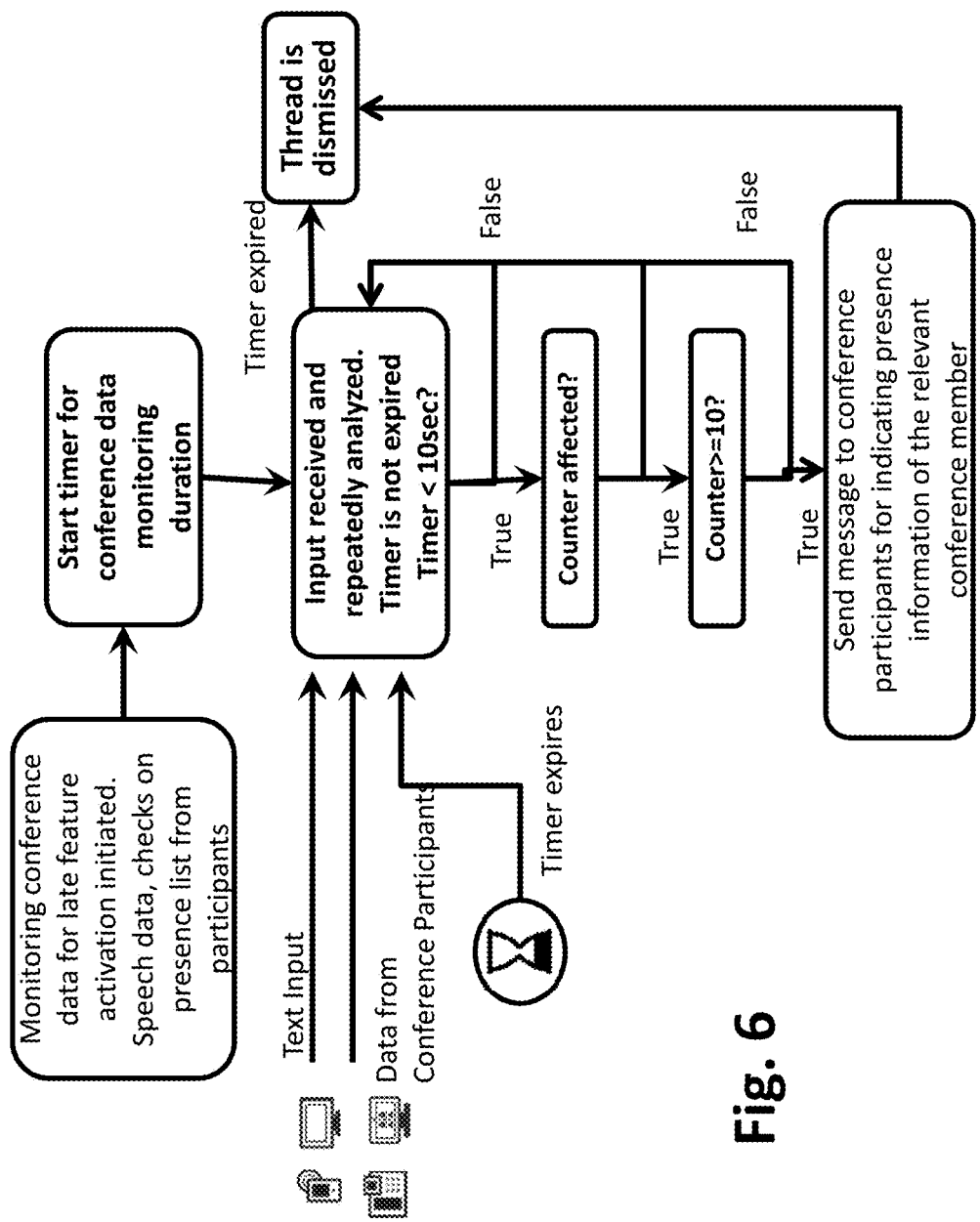
FIG. 6 schematically illustrates a monitoring process and input analysis by feature activation controller according to an embodiment of the invention.

FIG. 6 schematically illustrates a monitoring process and input analysis carried out by the feature activation controller according to an embodiment of the invention. Each input, either from conference participants 7, 7', 7", 7'" or from a translation of speech into text are analyzed and if an input that should increase the counter is identified, feature activation is verified until the monitoring period expires (for example for 10 seconds). Then, the feature activation process is completed.

In the following, it is described how the above described mechanism could be trained and adjusted so that the point system for activating the feature is based on users' habits and behaviors. The machine learning method will be based on adjusting the rating of each input (increase or decrease the points), adjusting the counter value for feature activation, limiting or extending the time limit for activation and identifying new actions that could increase the possibility of needing a presence notification. Also, the indication to adjust those values should be based on the participants' actions that follow, when someone is mentioning the name of a conference participant. If this participant is responding in this call, then an immediate indication on how input from a relevant participant is requested is obtained. However, also when the name of a participant is mentioned, the participant is not in the call and the conversation proceeds without any interruption, then this is an indication not to activate the feature. This means that in parallel to the mechanism that monitors whether a special presence status presentation should be activated, also a mechanism or process to update the relevant input data that is supposed to be monitored, the points assigned to each input and the level of point limit that triggers the feature activation is initiated.

The ML mechanism is based on the different inputs received from conference participants 7, 7', 7", 7'" in relation to the status of the referenced participant. The idea is to identify when a conference participant is really questioned during a session, which implies that the status presentation of this participant would be helpful for the conversation. What is monitored are the words used in the same phrase with the referenced name of the participant. If the next person who speaks during the conference is the referenced conference member, then a positive match is verified, and the words used are marked for future monitoring. Statistics are kept for those words for a predefined period of time, and then they are released.

Thus, if the use of a word in the same phrase of a conference participant in phrase with tone question leads with a percentage greater than 80% to a reply from the referenced participant, when this participant is active in the conference, then this word is also monitored by the feature activation mechanism 10 and its presence adds one additional point upon occurrence. In addition, if the referenced participant is not active in the conference and the use of the specific word results in the active conference participants looking into the presence information section of the application, then this is also an indication that the presence of this participant is required, and again the presence of this word adds one additional point upon occurrence. Other training processes are conceivable too, but are not further described here.

For example, according to another embodiment, each participant may store a key phrase that would automatically trigger the activation of the feature upon occurrence. For example, if one participant of the conference is addressed with the key word "At" before the referenced name, then the application directly presents the status of this user. For example, when recognizing the words "At Bob", the term "At" informs the tool that a specific conference participant will be questioned. With this combination, the conference controller directly initiates the process to inform to the conference participants about the status of the referenced conference participant.

Figure 7:
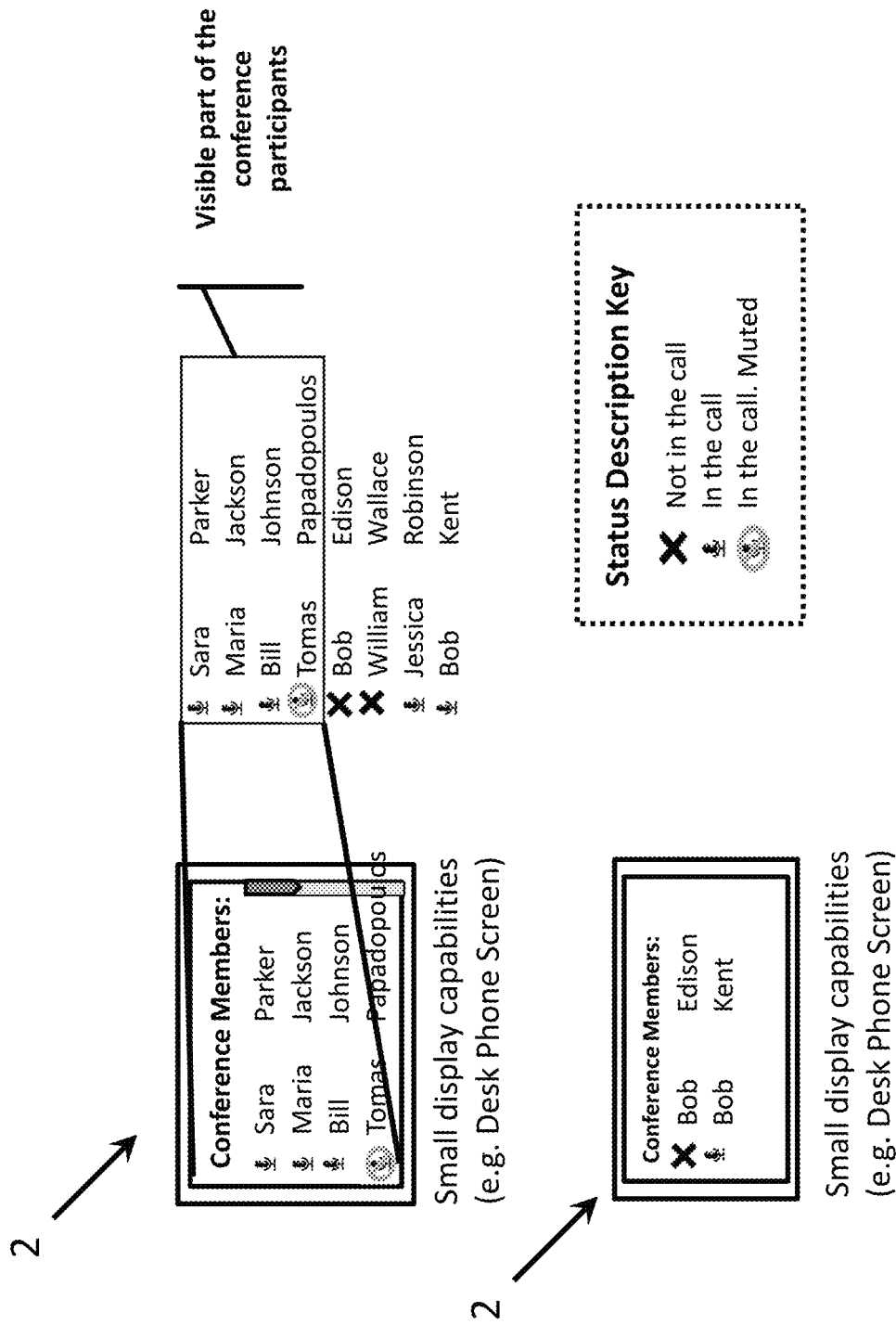
FIG. 7 illustrates a display change for predefined period of time for displaying the presence of specific participants on desk phones according to an embodiment of the invention.
Figure 8:
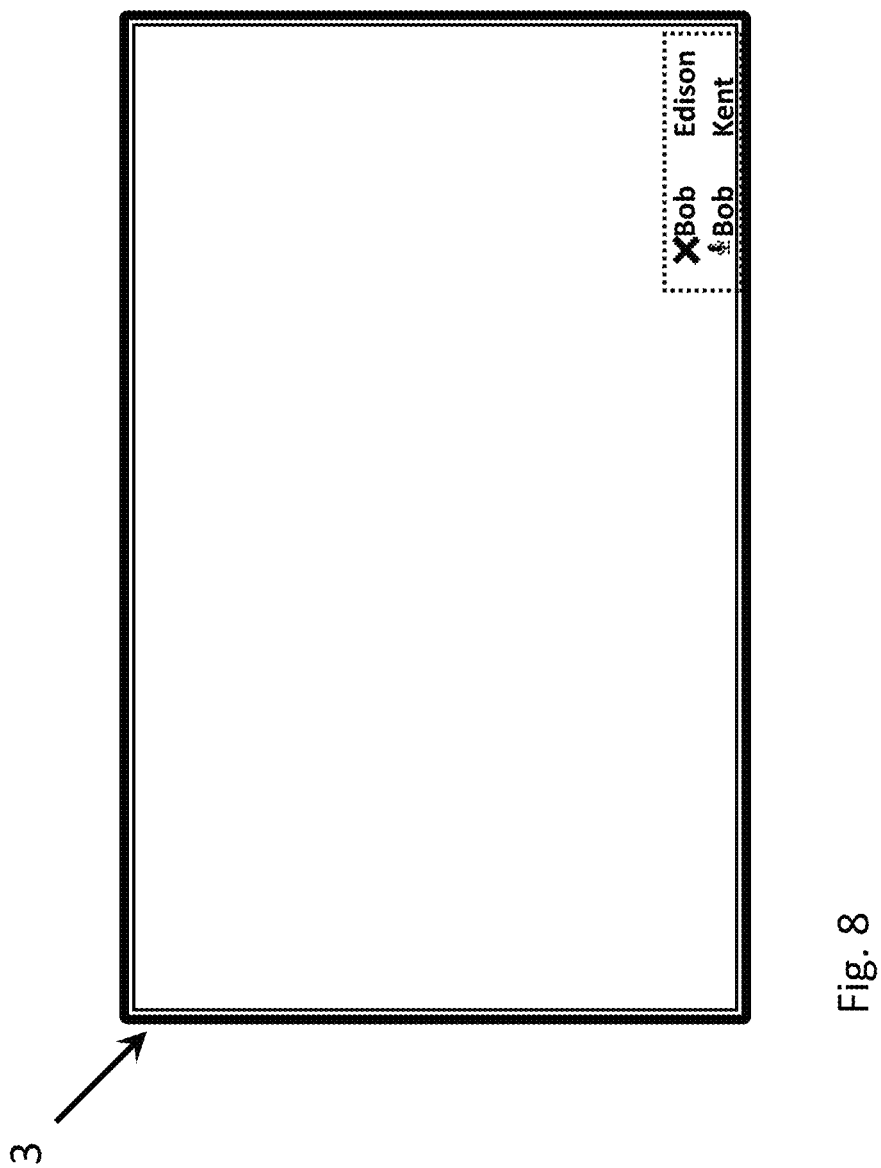
FIG. 8 illustrates a display change for a predefined period of time for displaying the presence of specific participants while screen sharing.

FIG. 7 illustrates a display change for predefined period of time for displaying the presence of specific participants on desk phones according to an embodiment of the invention. For example, the presence information may be changed for a predetermined period of time, for example, for 5 seconds, or some kind of information may pop up similarly for a predefined period of time as shown in FIG. 8. This information may be triggered only for the conference moderators, or the conference participant who mentioned the relevant name or all the conference participants.

Depending on the capabilities of each device, also voice prompts may be utilized via the conference media controller if this is more convenient for the conference participants, for example, if someone is not using an application to enter the call but is joining via dial in from a mobile station. Those voice prompts may be descriptive for the presence status or may be just a tone indicating the absence of a participant. In both cases it would not be as convenient as a display information but could still be useful if it is the only chance to provide this information.

It should be appreciated that different embodiments of the method, communication system, and a communication apparatus can be developed to meet different sets of design criteria. For example, the particular type of network connection, server configuration or client configuration for a device for use in embodiments of the method can be adapted to account for different sets of design criteria. As yet another example, it is contemplated that a particular feature described, either individually or as part of an embodiment, can be combined with other individually described features, or parts of other embodiments. The elements and acts of the various embodiments described herein can therefore be combined to provide further embodiments. Thus, while certain exemplary embodiments of a telecommunication apparatus, telecommunication device, terminal device, a network, a server, a communication system, and methods of making and using the same have been shown and described above, it is to be distinctly understood that the invention is not limited thereto but may be otherwise variously embodied and practiced within the scope of the following claims.

What is claimed is:

1. A computer-implemented method of performing a Web Real-Time Communication-based (WebRTC-based) communication and collaboration session with a plurality of predefined participants, wherein each participant from the plurality of predefined participants has a status of either being present, of being absent, or being present but muted, the method comprising:
  detecting that a participant from the plurality of predefined participants is addressed by another participant from the plurality of predefined participants for answering a question or for submitting a comment during the communication and collaboration session;
  verifying whether a presence status of the participant to answer the question or to submit a comment is required to be presented to the plurality of predefined participants;
  in response to a verification that the presence status of the participant to answer the question or to submit a comment needs to be presented, activating a feature for presenting presence information to the plurality of predefined participants, wherein the activating of the feature is triggered when a reference to a participant from the plurality of predefined participants is detected; and
  after the feature activation step is triggered, monitoring a behavior of the participants from the plurality of predefined participants.

2. The method of claim 1, wherein the monitoring step comprises adding points to a feature activation trigger counter, wherein the points are assigned to specific types of behavior.

3. The method of claim 2, comprising:
  in response to the feature activation trigger counter exceeding a predetermined threshold value within a predetermined time period, activating the feature for presenting presence information to the plurality of predefined participants.

4. The method of claim 3, wherein the monitoring comprises at least one of:
  verifying a tone in a phrase during the communication and collaboration session that includes the participant to answer the question or to submit a comment,
  verifying whether the presence status of the participant to answer the question or to submit a comment is present or absent or present but muted, verifying whether the participant that addresses the participant to answer the question or to submit a comment is currently sharing his or her desktop, verifying whether the name of the participant to answer the question or to submit a comment is repeated with a normal tone or with a question tone, and verifying whether another participant from the predefined plurality of participants checks the list of participants.

5. The method of claim 4, wherein each of the verification steps of the monitoring step are considered as a specific behavior that is assigned to a predetermined number of points.

6. The method of claim 4, comprising:

assigning points to the specific behaviors, the points being configurable.

7. The method of claim 6, wherein the points modified based on machine learning.

8. The method of claim 7, wherein the machine learning comprises:

adjusting the rating of each input for increasing or decreasing the points, adjusting the counter value for the feature activation, adjusting the time period for triggering the feature activation, and identifying new behaviors for verifying that the presence status of the participant to answer the question or to submit a comment needs to be presented.

9. A computer-implemented method of performing a Web Real-Time Communication-based (WebRTC-based) communication and collaboration session with a plurality of predefined participants, wherein each participant from the plurality of predefined participants has a status of either being present, of being absent, or being present but muted, the method comprising:

detecting that a participant from the plurality of predefined participants is addressed by another participant from the plurality of predefined participants for answering a question or for submitting a comment during the communication and collaboration session;

verifying whether a presence status of the participant to answer the question or to submit a comment is required to be presented to the plurality of predefined participants;

in response to a verification that the presence status of the participant to answer the question or to submit a comment needs to be presented, activating a feature for presenting presence information to the plurality of predefined participants; and displaying the presence status of the participant to answer a question or to submit a comment for a predetermined time period to at least one participant from the plurality of predefined participants.

10. The method of claim 9, wherein the feature activation step is triggered when a reference to a participant from the plurality of predefined participants is detected.

11. The method of claim 9, comprising:

monitoring a key phrase for triggering the feature activation.

12. The method of claim 9, wherein the displaying the presence status of the participant is displayed to at least a moderator of the communication and collaboration session.

13. The method of claim 9, wherein the communication and collaboration session is a scheduled conference.

14. A computer-implemented method of performing a Web Real-Time Communication-based (WebRTC-based) communication and collaboration session with a plurality of predefined participants, wherein each participant from the plurality of predefined participants has a status of either being present, of being absent, or being present but muted, the method comprising:

detecting that a participant from the plurality of predefined participants is addressed by another participant from the plurality of predefined participants for answering a question or for submitting a comment during the communication and collaboration session;

verifying whether a presence status of the participant to answer the question or to submit a comment is required to be presented to the plurality of predefined participants;

in response to a verification that the presence status of the participant to answer the question or to submit a comment needs to be presented, activating a feature for presenting presence information to the plurality of predefined participants; and outputting an audio signal that indicates the presence status of the participant to answer a question or to submit a comment for a predetermined time period to at least one participant from the plurality of predefined participants.

15. A Web Real-Time Communication-based (WebRTC-based) communication and collaboration platform comprising:

a media server that is adapted to carry out a computer-implemented method having a processor connected to a non-transitory computer readable medium, the media server comprising a conference media controller, a display controller, a user presence and call signaling controller, a video to text component, and a feature activation component, the computer-implemented method comprising:

detecting that a participant from the plurality of predefined participants is addressed by another participant from the plurality of predefined participants for answering a question or for submitting a comment during the communication and collaboration session;

verifying whether a presence status of the participant to answer the question or to submit a comment is required to be presented to the plurality of predefined participants;

in response to a verification that the presence status of the participant to answer the question or to submit a comment needs to be presented, activating a feature for presenting presence information to the plurality of predefined participants; and communicating with at least one terminal device of the participant for displaying the presence status of the participant to answer a question or to submit a comment for a predetermined time period for at least one participant from the plurality of predefined participants.

16. The WebRTC-based communication and collaboration platform of claim 15, wherein the communication and collaboration session is a scheduled conference.

17. The WebRTC-based communication and collaboration platform of claim 15, wherein the at least one terminal device comprises a mobile phone, a personal computer, a computer device, a desk phone, or a communication endpoint.

18. The WebRTC-based communication and collaboration platform of claim 15, wherein the activating of the feature is triggered when a reference to a participant from the plurality of predefined participants is detected and the method also comprises:

after the activating of the feature is triggered, monitoring a behavior of the participants from the plurality of predefined participants.

19. The WebRTC-based communication and collaboration platform of claim 15, wherein the method also comprises:
monitoring a key phrase for triggering the activating of the feature.

20. The WebRTC-based communication and collaboration platform of claim 16, wherein the method also comprises:
communicating with the at least one terminal device for outputting an audio signal that indicates the presence status of the participant to answer a question or to submit a comment for a predetermined time period for at least one participant from the plurality of predefined participants.

* * * * *